350-452
OR 3,679,294

United St
Hofmann et al.

[15] 3,679,294
[45] July 25, 1972

[54] FRESNEL OPTICAL SYSTEMS HAVING ECHELONS ON AT LEAST ONE OF ITS FACES

[72] Inventors: Christian Hofmann, Jena; Jorg Neumann, Hermsdorf, both of Germany

[73] Assignee: Jenoptik Jena G.m.b.H., Jena, Germany

[22] Filed: Nov. 18, 1970

[21] Appl. No.: 32,494

[52] U.S. Cl............................................350/211, 350/292
[51] Int. Cl. ......................................................G02b 3/08
[58] Field of Search....................................350/211

[56] References Cited
UNITED STATES PATENTS 2,751,816  6/1956  Strong..............................350/211 UX
3,334,958  8/1967  Appeldorn..........................350/211
3,523,721  8/1970  Hofmann............................350/211
3,572,903  3/1971  Hofmann............................350/211

*Primary Examiner*—John K. Corbin

[57] ABSTRACT

An optical system comprising at least one optically active face has Fresnel echelons on one of these optically active faces. The echelons and the face carrying them are corrected in such a manner as to produce an aberrationless image of a circle substantially concentric with the optical axis of the system. The state of correction of the system is mathematically defined. The system may consist of one or a plurality of lenses or it may be a reflector.

9 Claims, 5 Drawing Figures

FRESNEL OPTICAL SYSTEMS HAVING ECHELONS ON AT LEAST ONE OF ITS FACES

This invention relates to Fresnel optical systems which have echelons on at least one of their faces and produce an aberrationless image of a circle substantially centering on the optical axis.

As is well known, Fresnel lenses correct the spherical aberration of optical systems in much the same manner as aspherical surfaces do, the only exception being structure dependent residual aberrations proportional to the groove widths. Owing to the aspherical curvature of the faces carrying the Fresnel echelons, which depends on the general aplanasy condition, it is possible additionally to obtain aplanatic correction in the meridional section, so that for example aplanatic Fresnel condensers can be calculated. If such condensers are required to image large luminous fields or to illuminate large pupils, aplanatic correction is no longer adequate, since aberrational imaging of the margin of the pupil involves loss of light.

It is an object of the present invention to obviate this disadvantage by providing a condenser of the foregoing kind which images the marginal region of the pupil without aberration.

To this end, the present invention consists in providing a Fresnel optical system which has echelons on at least one of its faces and produces an aberrationless image of a circle substantially concentric with the optical axis, wherein the meridional curve of the said face is determined by the equation $$n_m'^2 \sin(\sigma_m'' - \sigma_m''') - n_m' n_{m-1}' \sin(\sigma_{m-1}'' - \sigma_m''')$$
$$- n_m' n_{m-1}' \sin(\sigma_m'' - \sigma_{m-1}''') + n_{m-1}'^2 \sin(\sigma_{m-1}'' - \sigma_{m-1}''') = 0$$

and the active flanks of the Fresnel echelons are determined by the equations $$\tan \varphi_m^{I} = \frac{n'_{m-1} \sin \sigma'_{m-1}{}^{I} - n'_m \sin \sigma_m'{}^{I}}{n'_{m-1} \cos \sigma'_{m-1}{}^{I} - n'_m \cos \sigma_m'{}^{I}}$$

and $$\tan \varphi_m^{II} = \frac{n'_{m-1} \sin \sigma'_{m-1}{}^{II} - n'_m \sin \sigma_m'{}^{II}}{n'_{m-1} \cos \sigma'_{m-1}{}^{II} - n'_m \cos \sigma_m'{}^{II}}$$

In these equations,
$n_m'$ is the refractive index on the image side of the Fresnel face,
$n_{m-1}'$ is the refractive index on the object side of the Fresnel face,
$\sigma_m''$ is the angle enclosed by an imaging ray I and the optical axis in the image space of the Fresnel face,
$\sigma_{m-1}''$ is the angle enclosed by the ray I and the optical axis in the object space of the Fresnel face,
$\sigma_m'''$ is the angle enclosed by an imaging ray II and the optical axis in the image space of the Fresnel face,
$\sigma_{m-1}'''$ is the angle enclosed by the ray II and the optical axis in the object space of the Fresnel face,
$\phi_m'$ is the angle enclosed by the normal to the active Fresnel face and the optical axis of the ray I, and
$\phi_m''$ is the angle enclosed by the normal to the active Fresnel face and the optical axis of the ray II.

The simplest case is that of a lens having Fresnel echelons on one of its faces. With a system of two lenses, the one lens may have smooth faces, which are preferably spherical; and the other lens, a smooth face and a face carrying Fresnel echelons the base of which is corrected according to an equation (6) referred to hereinafter. In the optical system of the invention, it is also possible to choose the refractive powers and the $\nu$ values of the lenses in such a manner as to satisfy the achromasy condition.

According to another aspect of the invention the optical system comprises two lenses each of which has a plane face and a Fresnel face, the Fresnel echelons on the two respective faces being determined by the equation $$n_m'^2 \sin(\sigma_m'' - \sigma_m''') - n_m' n_{m-1}' \sin(\sigma_{m-1}'' - \sigma_m''')$$
$$- n_m' n_{m-1}' \sin(\sigma_m'' - \sigma_{m-1}''') + n_{m-1}' \sin(\sigma_{m-1}'' - \sigma_{m-1}''') = 0$$

According to still another aspect of the invention, the Fresnel faces of the optical system face one another, the space between them being preferably negligible.

According to a further aspect of the invention, the optical system comprises only faces that are corrected in themselves, each face having Fresnel echelons the bases of which are determined by the equation $$\frac{n'_m{}^2 \cdot \frac{2y_m'}{s_m' - p_m}}{\sqrt{1+\left(\frac{h_m-y_m'}{s_m'-p_m}\right)^{2'}} \cdot \sqrt{1+\left(\frac{h_m+y_m'}{s_m'-p_m}\right)^{2'}}}$$

$$+ \frac{n_m n_m' \cdot \left(\frac{h_m-y_m}{s_m-p_m} - \frac{h_m+y_m'}{s_m'-p_m}\right)}{\sqrt{1+\left(\frac{h_m-y_m}{s_m+p_m}\right)^{2'}} \cdot \sqrt{1+\left(\frac{h_m+y_m'}{s_m'-p_m}\right)^{2'}}}$$

$$+ \frac{n_m n_m' \cdot \left(\frac{h_m-y_m'}{s_m'-p_m} - \frac{h_m+y_m}{s_m-p_m}\right)}{\sqrt{1+\left(\frac{h_m-y_m'}{s_m'-p_m}\right)^{2'}} \cdot \sqrt{1+\left(\frac{h_m+y_m}{s_m-p_m}\right)^{2'}}}$$

$$+ \frac{n_m{}^2 \cdot \frac{2y_m}{s_m-p_m}}{\sqrt{1+\left(\frac{h_m-y_m}{s_m-p_m}\right)^{2'}} \cdot \sqrt{1+\left(\frac{h_m-y_m}{s_m-p_m}\right)^{2'}}} = 0$$

In this equation,
$n_m$ is the index of refraction on the object side of the face $m$,
$n_m'$ is the index of refraction on the image side of the face $m$,
$h_m$ is the height of incidence of the imaging ray,
$p_m$ is the corresponding height of arc,
$s_m$ is the distance between object and lens vertex,
$s_m'$ is the distance between image and lens vertex,
$m$ m is the dimension of the object in the meridional section on either side of the optical axis of the system, referring to the face $m$, and
$y_m'$ is the dimension of the image in the meridional section on either side of the optical axis of the system, referring to the face $m$.

Making $n'$ equal to $-n$ enables the manufacture of Fresnel reflectors of corresponding correction.

If the optical system of the reflector has echelons, the base is determined by the equation $$\frac{\frac{2y'}{s'-p}}{\sqrt{1+\left(\frac{h-y'}{s'-p}\right)^2} \cdot \sqrt{1+\left(\frac{h+y'}{s-p}\right)^2}}$$

$$+ \frac{\left(\frac{h-y}{s-p} - \frac{h+y'}{s'-p}\right)}{\sqrt{1+\left(\frac{h-y}{s-p}\right)^2} \cdot \sqrt{1+\left(\frac{h+y'}{s'-p}\right)^2}}$$

$$+ \frac{\left(\frac{h-y'}{s'-p} - \frac{h+y}{s-p}\right)}{\sqrt{1+\left(\frac{h-y'}{s'-p}\right)^2} \cdot \sqrt{\left(1+\frac{h+y}{s-p}\right)^2}}$$

$$+ \frac{\frac{2y}{s-p}}{\sqrt{1+\left(\frac{h-y}{s-p}\right)^2} \cdot \sqrt{1+\left(\frac{h+y}{s-p}\right)^2}} = 0$$

wherein
$h$  is the height of incidence of the imaging ray,
$p$  is the corresponding height of arc, $s$ and $s'$ are respectively the distance between object and lens vertex and the distance between image and lens vertex,
$y$ and $y'$ are respectively the dimensions of the object and the image in the meridional section on either side of the optical axis of the Fresnel reflector.

It stands to reason that the system of the invention can be adapted to the particular case of a quasi aberrationless image, in which the equations defining the Fresnel faces are minimum conditions. In any case, a Fresnel face curved according to the invention, or two Fresnel faces according to the invention having any predetermined and preferably plane base, produce an optimum image of the pupil in which a circle substantially concentric with the optical axis appears aberrationless.

In order that the invention may be more readily understood, reference is made to the accompanying drawings which illustrate diagrammatically and by way of example four embodiments thereof, and in which FIG. 1 is a diagrammatical representation for explaining the mathematical relations;

Figure 1:
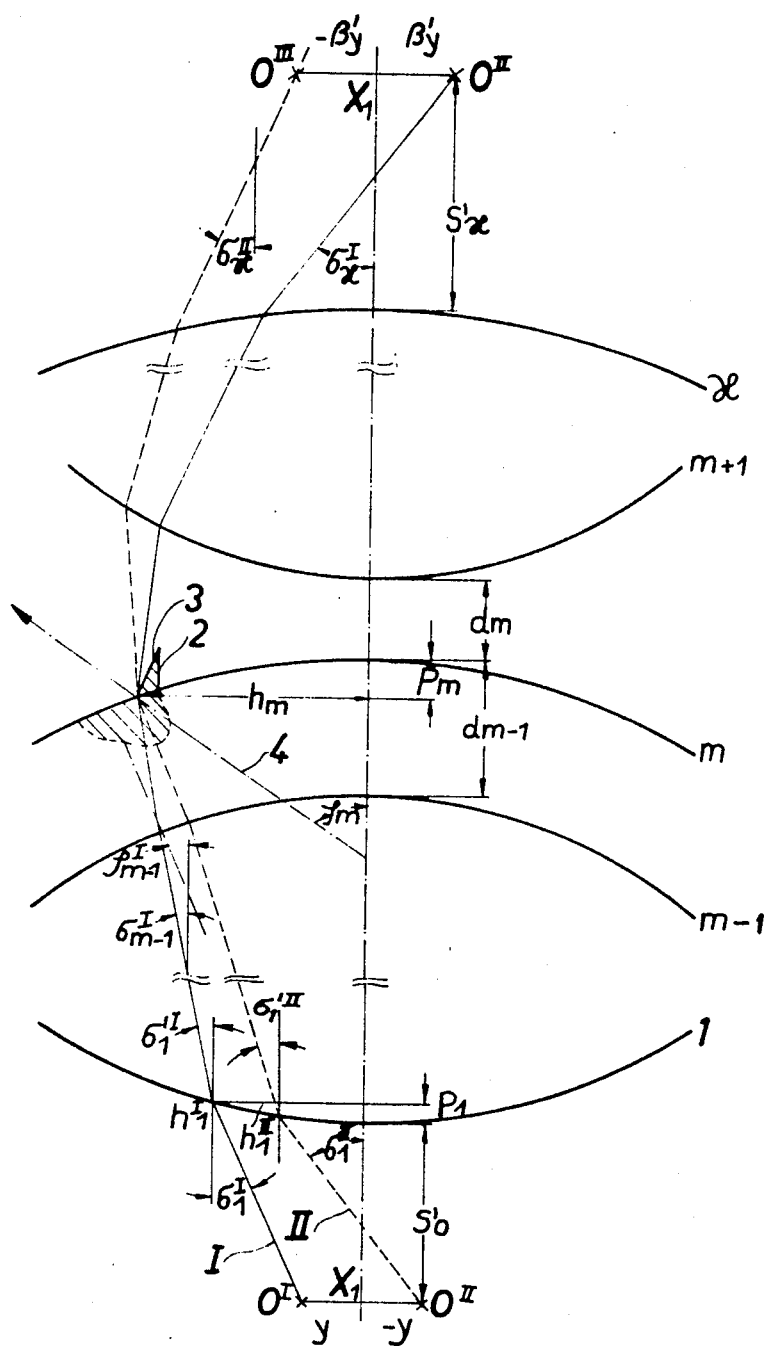

In FIG. 1 of the drawings, a plurality of optically active faces $1, \ldots m-1, m+1, \ldots \kappa$, form an optical system having an optical axis $X_1-X_1$, the face $m$ carrying Fresnel echelons. For the sake of clarity, only one echelon 2 and its active flank 3 are shown. A normal 4 to the active flank 3 and the axis $X_1-X_1$ enclose an angle $\phi_m$. An object to be imaged is at a distance $s_o' = s_1$ from the face 1 and extends by $y$ and $-y$ on either side of the optical axis $X_1-X_1$. The object has end points $O^I$ and $O^{II}$. Imaging rays I and II emitted by these points are respectively inclined to the axis $X_1-X_1$ at angles $\sigma_1'$ and $\sigma_1''$ and impinge upon the face 1 at heights $h_1'$ and $h_1''$, where they are so deflected as to proceed at angles $\sigma_1''$ and $\sigma_1'''$ relative to the axis $X_1-X_1$. Corresponding heights $h_i', h_i''$ and angles of inclination $\sigma_i', \sigma_i'', \sigma_i''', \sigma_i''''$ are at each surface $i$ of the $\kappa$-faced system, and to each height of ray incidence $h_i$ corresponds a height of arc $p_i$ (only $p_1$ and $p_m$ shown). The distances $d_i$ of the sequential faces (only $d_{m-1}$ and $d_m$ shown) correspond to the thicknesses of the lenses.

An image $O'^{II}O'^{III}$ of the object $O^I O^{II}$ is formed in the image space at a distance $s_\kappa'$ from the face $\kappa$. This distance extends by $\beta'y$ and $-\beta'y$ on either side of the axis $X_1-X_1$.

Fresnel systems supplying optimum pupil images are calculated with due consideration of FIG. 1, starting from the law of refraction as expressed by the equation $$n_i' (\sin \sigma_i' - \cos \sigma_i' \cdot \tan \phi_i) - n_i (\sin \sigma_i - \cos \sigma_i \cdot \tan \phi_i) =$$
$$\uparrow \{n_i' (\sin \sigma_i' - \cos \sigma_i' \cdot \tan \phi_i)\} = 0 \qquad 1$$

and from the formula of the transition from a face $i$ to an adjacent face $i+1$, as expressed by the equation $$h_{i+1} = h_i - (d_i + p_{i+1} - p_i) \tan \sigma_i' \qquad 2$$

These two equations are applied to two meridional comatical rays I and II which respectively emanate from the upper and lower end points $O^I$ and $O^{II}$ of the object and are to intersect in the Fresnel face $m$. Both rays are respectively characterized by $h_i^I, p_i^I, \tan \sigma^I$ and $h_i^{II}, p_i^{II}, \tan \sigma_i^{II}$ at the faces $i$ of the $\kappa$-faced system 1 to $\kappa$. In the object space and in the image space of the system 1 to $\kappa$ the equation 2 respectively takes the following forms, the imaging scale $\beta'$ being $y'/y$:

$$h_1' - y = (s_1 - p_1') \cdot \tan \sigma_1' \qquad 2a$$
$$h_1'' + y = (s_1 - p_1'') \cdot \tan \sigma_1'' \qquad 2b$$

and $$h_x^I - \beta'y = (s_x' - p_x) \cdot \tan \sigma_x^{I'} \qquad (2c)$$
$$h_x^{II} + \beta y = (s_x' - p_x^{II}) \cdot \tan \sigma_x^{II'} \qquad (2d)$$

Since the rays I and II without restriction of the general rule can be expected to intersect at any desired place, the following magnitudes are used for the correcting Fresnel face $m$ $$h_m' = h_m'' = h_m \qquad 3a$$

and, accordingly, $p_m' = p_m'' = p_m$ and $\tan \phi_m' = \tan \phi_m'' = \tan \phi_m$ \qquad 3b For the determination of $h_m$ by means of the geometrical magnitudes at the various faces, the following equations are obtained:

$$h_m = y + (s_1 - p_1^I) \tan \sigma_1^I$$
$$- \sum_{i=1}^{m-1} (d'_i + p_{i+1}^I - p_i^I) \tan \sigma'_i^I \qquad (4a)$$

$$h_m = -y + (s_1 - p_1^{II}) \tan \sigma_1^{II}$$
$$- \sum_{i=1}^{m-1} (d'_i + p_{i+1}^{II} - p_i^{II}) \tan \sigma'_i^{II} \qquad (4b)$$

$$h_m = \beta'y + (s'_x{}^I - p_x^I) \tan \sigma'_x{}^I$$
$$+ \sum_{i=x-1}^{m} (d'_i + p_{i+1}^I - p_i^I) \tan \sigma'_i^I \qquad (4c)$$

$$h_m = -\beta'y + (s'_x - p_x^{II}) \tan \sigma'_x{}^{II}$$
$$+ \sum_{i=x-1}^{m} (d'_i + p_{i+1}^{II} - p_i^{II}) \tan \sigma'_i^{II} \qquad (4d)$$

According to Equation (3), the magnitudes of $\tan \varphi_m$ which result from $$\tan \varphi_m^I = \frac{n'_{m-1} \sin \sigma'_{m-1}^I - n'_m \sin \sigma'_m^I}{n'_{m-1} \cos \sigma'_{m-1}^I - n'_m \cos \sigma'_m^I} \qquad (5a)$$

and $$\tan \varphi_m^{II} = \frac{n'_{m-1} \sin \sigma'_{m-1}^{II} - n'_m \sin \sigma'_m^{II}}{n'_{m-1} \cos \sigma'_{m-1}^{II} - n'_m \cos \sigma'_m^{II}} \qquad (5b)$$

are required to be equal to each other, so that the following correction condition is obtained:-

$$n_m'^2 \cdot \sin(\sigma_m'' - \sigma_m''') - n_m' n_{m-1}' \cdot \sin(\sigma_{m-1}'' - \sigma_m''')$$
$$- n_m' n_{m-1}' \cdot \sin(\sigma_m'' - \sigma_{m-1}''') + n_{m-1}'^2 \cdot \sin(\sigma_{m-1}'' - \sigma_{m-1}''') = 0 \qquad 6$$

This condition is to the effect that the imaging rays I and II intersect each other at a point in the Fresnel face $m$. Calculation of any particular Fresnel face by means of the equations 4 to 6 may have to be iterative. The magnitudes obtained after each one of these calculations are corrected and included in the equations. For the angles in equation 6 there holds good the relations $$\tan \sigma'_{m-1}{}^\alpha = \frac{1}{n'_{m-1} \cos \sigma'_{m-1}{}^\alpha} \left[ n_1 \cdot \cos \sigma_1{}^\alpha \cdot \frac{h_1{}^\alpha - y^\alpha}{s_1 - p_1{}^\alpha} \right.$$
$$\left. + \sum_{i=1}^{m-1} \tan \varphi_i{}^\alpha (n'_i \cdot \cos \sigma'_i{}^\alpha - n'_{i-1} \cos \sigma'_{i-1}{}^\alpha) \right] \qquad (7a)$$

and $$\tan \sigma'_m{}^\alpha = \frac{1}{n'_m \cdot \cos \sigma'_m{}^\alpha} \left[ n' \cdot \cos \sigma'_x{}^\alpha \cdot \frac{h_x{}^\alpha - \beta' y^\alpha}{s'_x - p_x{}^\alpha} \right.$$
$$\left. + \sum_{i=x}^{m+1} \tan \varphi_i{}^\alpha (n'_{i-1} \cos \sigma_{i-1}{}^\alpha - n_i \cdot \cos \sigma'_i{}^\alpha) \right] \qquad (7b)$$

wherein $\alpha$ is equal to I; II and $y'$ are equal to $y$, and $y''$ is equal to $-y$. The equations (4a) to (4d), (7a), (7b) and (6) determine the base of the correcting Fresnel face and, accordingly, the inclination of its active flank as well as the inclinations of the active flanks of the two correcting Fresnel faces the bases of which have a predetermined function.

For an optically active single face, only the equations (2a) to (2b) and (6) are applied, it being advantageous to eliminate the angles by the cartesian co-ordinates.

$$U = \frac{n'^2 \cdot \frac{2y'}{s'-p}}{\sqrt{1+\left(\frac{h-y'}{s'-p}\right)^2} \cdot \sqrt{1+\left(\frac{h+y'}{s'-p}\right)^2}}$$

$$+ \frac{n \cdot n' \cdot \left(\frac{h-y}{s-p} - \frac{h+y'}{s'-p}\right)}{\sqrt{1+\left(\frac{h-y}{s+p}\right)^2} \cdot \sqrt{1+\left(\frac{h+y'}{s'-p}\right)^2}}$$

$$+ \frac{n \cdot n' \cdot \left(\frac{h-y'}{s'-p} - \frac{h+y}{s-p}\right)}{\sqrt{1+\left(\frac{h-y'}{s'-p}\right)^2} \cdot \sqrt{1+\left(\frac{h+y}{s-p}\right)^2}}$$

$$+ \frac{n^2 \cdot \frac{2y}{s-p}}{\sqrt{1+\left(\frac{h-y}{s-p}\right)^2} \cdot \sqrt{1+\left(\frac{h+y}{s-p}\right)^2}} = 0$$

(8)

In this equation, $y' = \beta'y$. If an object at infinity is imaged, the heights $+y$ and $-y$ of the object are to be replaced by the inclinations of the principal rays $\tan \sigma = -y/s$ and $\tan(-\sigma) = +y/s$, so that there is obtained $$\lim_{s \to \infty} U = - \frac{n'^2 \cdot \frac{2y'}{f'-p}}{\sqrt{1+\left(\frac{h-y'}{f'-p}\right)^2} \cdot \sqrt{1+\left(\frac{h+y'}{f'-p}\right)^2}}$$

$$-n \cdot n' \sin \sigma \cdot \left(\frac{1}{\sqrt{1+\left(\frac{h+y'}{f'-p}\right)^2}}\right) + \frac{1}{\sqrt{1+\left(\frac{h-y'}{f'-p}\right)^2}}$$

$$+ n \cdot n' \cos \sigma \cdot \left[\frac{\frac{h+y'}{f'-p}}{\sqrt{1+\left(\frac{h+y'}{f'-p}\right)^2}} - \frac{\frac{h-y'}{f'-p}}{\sqrt{1+\left(\frac{h-y'}{f'-p}\right)^2}}\right]$$

$$+ 2n^2 \cdot \sin \sigma \cos \sigma = 0$$

(8a)

Fresnel faces of this kind for optimum pupil images can, at most, serve as Fresnel reflectors ($n' = -n$). As there are no continuously refracting faces of the correction characteristics here in question, a Fresnel lens for producing optimum pupil images would have to comprise two such faces and, apart from considerable expenditure, there would be unwelcome shadow effects due to superposition of interferences by such flanks on both Fresnel faces as do not image the pupil. Fresnel lenses producing optimum pupil images are therefore made up of two uncorrected faces, the one of these faces being continuous and generally spherical, and the other being the Fresnel face determined by the equations (4), (6) and (7), which produces the image desired.

Figure 2:
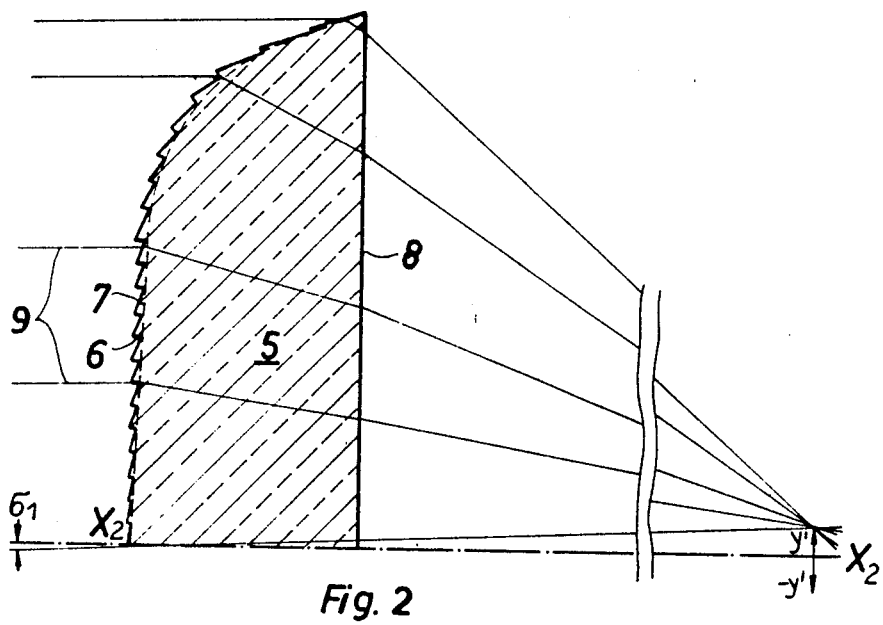
FIG. 2 is one half of a lens according to a first embodiment.

In the embodiment of FIG. 2, a Fresnel lens 5 has a Fresnel face 6, an optically active base 7 (shown in dash lines) and a continuous plane face 8. The optical axis of the Fresnel lens 5 is $X_1-X_2$. A bundle 9 of parallel rays inclined at an angle $\sigma_1$ to the axis $X_1-X_2$ emanates from an object (not shown) which is at a distance $s_1 = \infty$ from the Fresnel face 6. The Fresnel lens 5 produces an image $y', -y'$ in its image-side focal plane. The base 7 is corrected according to the equation (6), which it satisfies.

The equations (2), (4), (6) and (7) also enable optimum pupil imaging capacity to be iteratively calculated with respect to any desired optical system by means of an optionally inserted Fresnel face. As the distribution of the refractive powers of the partial systems 1 to $m-1$ and $m+1$ to $\kappa$ can be preselected arbitrarily, it is possible for the achromasy condition to be observed in the complex systems for optimum pupil imaging. Accordingly, it is feasible iteratively to construct achromats which comprise a Fresnel face and produce an aberrationless image of a circle concentric with the optical axis.

Figure 3:
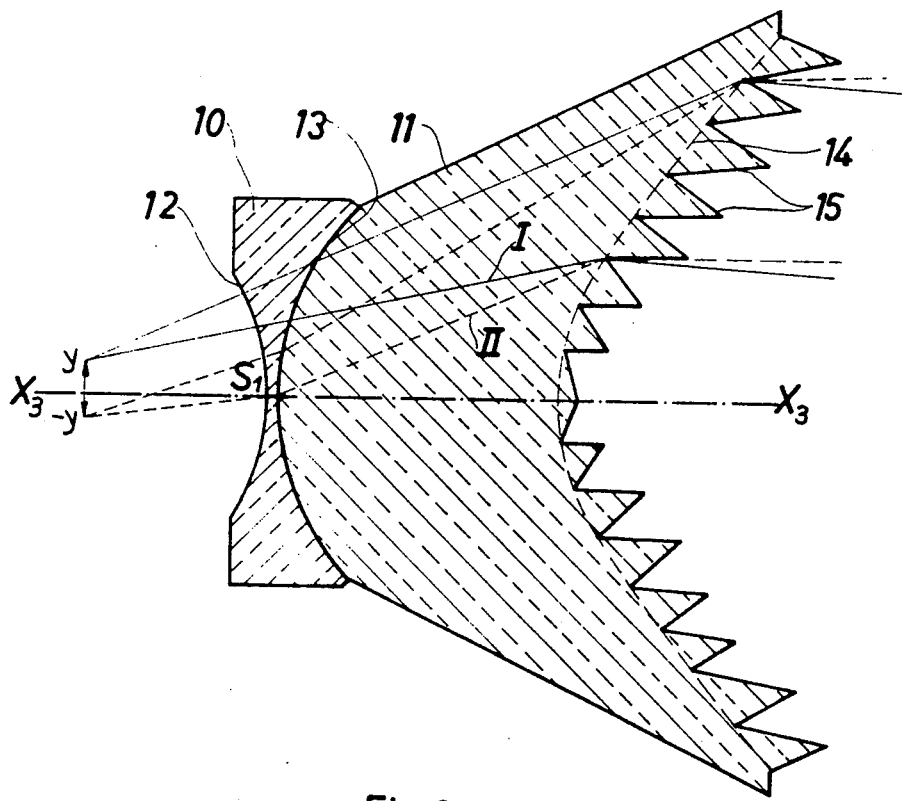
FIG. 3 is a second embodiment, namely an optical system comprising two lenses that include one Fresnel face.

In the embodiment of FIG. 3, an optical system comprises two elements 10 and 11 having an optical axis $X_3-X_3$. The elements 10 and 11 have optically active faces 12, 13 and 14. The face 13 is cemented, and the face 14 carries Fresnel echelons 15. The characteristics of the optical system 10, 11 are as follows:

TABLE 1

| Face $i$ | $n_i'$ | $d_i'$ [cm] | $s_i'$ [cm] | $r_i$ [cm] |
|---|---|---|---|---|
| 12 | 1 |  | 0.4000 | −0.78 |
| 13 | 1.6254 | 0.1000 |  | +0.78 |
| 14 | 1.4930 | 0.5523 |  |  |
|  | 1 |  | ∞ |  |

$f = 1$ cm

Hereinafter, the base 14 is calculated by means of the equation (6); and the height of incidence $h$, by means of the equations (4a) and (4b). These calculations include the magnitudes of the rays I and II as set out in the following Table 2.

TABLE 2

|  | ray I | ray II |
|---|---|---|
| $y$ [cm] | − 0.2750 | + 0.2750 |
| $\sigma_{12}$ [°] | − 34.51 | + 6.18 |
| $h_{12}$ [cm] | 0 | + 0.2356 |
| $p_{12}$ [cm] | 0 | − 0.0364 |
| $\phi_{12}$ [°] | 0 | − 17.58 |
| $\sigma_{12}'$ [°] | − 20.36 | − 3.23 |
| $h_{13}$ [cm] | 0.0375 | 0.2456 |
| $p_{13}$ [cm] | 0.0009 | 0.0397 |
| $\phi_{13}$ [°] | 2.75 | 18.35 |
| $\sigma_{13}'$ [°] | − 22.55 | − 5.26 |
| $h_{14}$ [cm] | 0.3003 | 0.3003 |
| $p_{14}$ [cm] | 0.0815 | 0.0815 |
| $\phi_{14}$ [°] | − 37.22 | − 37.22 |
| $\sigma_{14}'$ [°] | − 15 | + 15 |

The magnitude $h_{12}$ is preselected, and the angle $\sigma_{12}$ is calculated according to the relation $$\tan \sigma_{12} = \frac{h_{12} - y}{s_{12} - p_{12}}$$

which results from equation (4a) if $\Sigma = 0$. The magnitude $p_{12}$ results from $$p_{12} = r_{12}\left(1 - \sqrt{\frac{h^2_{12}}{r^2_{12}}}\right)$$

For $\phi_{12}$ there holds good the equation $$\sin \phi_{12} = h_{12}/r_{12}$$

and for $\sigma_{12}'$ the equation $$\sin(\sigma_{12}' - \phi_{12}) = n_{12}/n_{12}' \cdot \sin(\sigma_{12} - \phi_{12}).$$

The latter equation serves for the calculation of all magnitudes $\sigma_{i-1}'$. The magnitudes $\sigma_{13}$, $\sigma_{14}$, $h_{13}$, $p_{13}$ are calculated by applying the equations (4a) and (4b). By duly considering the equations (4a) and (4b), the magnitudes $h_{14}$ and $p_{14}$ are obtained from the equation (6), provided that this equation is satisfied. The inclinations $\phi$ of the flanks result from the equations (5a) or (5b).

The heights of incidence, which must be the same with both rays I and II, are calculated by insertion of the said magnitudes in the equations (4a) and (4b). Insertion in (4a) results in $h_m = − 0.2750 + (−0.4−0) \cdot (−0.6875) − [(0.1+0.0009) \cdot (−0.3711 + (0.5523+0.0815−0.0009) \cdot (−0.4152)]$ $h_m = +0.3003$ Insertion of the respective magnitudes in equation (4b) results in
$h_m = + 0.2750 + (-0.4+0.0364) \cdot (+0.1083) - [(0.1+ 0.0397+0.0364) \cdot (-0.0564) + (0.5523+0.0815-0.0397) \cdot (-0.0921bq]$
$h_m = +0.3003$.

Since images at infinity are concerned, the equations (4c) and (4d) can be neglected.

Insertion of the corresponding magnitudes in equation (6), results in $1 \cdot \sin(-15°-15°) - 1.493 \cdot \sin(-22.55°-15°) - 1.493 \cdot \sin(-15°+5.25°)$ $+2.2290 \sin(-22.55°+5.26°) = 0$ $-\sin 30° + 1.493 \sin 37.55° + 1.493 \sin 9.74° - 2.2290 \sin 17.29° = 0$ $+1.162 - 1.162 = 0$.

The equation (6) is obviously satisfied, the base 14 being thus corrected according to this equation.

In some cases, precise correction of the image of a circle concentric with the optical axis is not required and would not even make sense. Accordingly, the function U ($\neq 0$) defined by equation (6) is used as a measure of the deviation from the corrected condition. By means of this error function, an optimum solution can be determined for an optical system comprising $\kappa-1$ continuous and generally spherical faces and a Fresnel face on a preselected and preferably plane base. A system of the foregoing kind may simply be a single lens comprising a spherical face and a Fresnel face on a plane base.

The same correction characteristics as with a Fresnel face on a curved base determined by the equations (4), (6) and (7), can be obtained in an optical system by means of two Fresnel faces on preselected and preferably plane bases. Most important for practical purposes is a condenser corrected for circular pupils which comprises two Fresnel lenses with plane backs and plane Fresnel bases.

Figure 4:
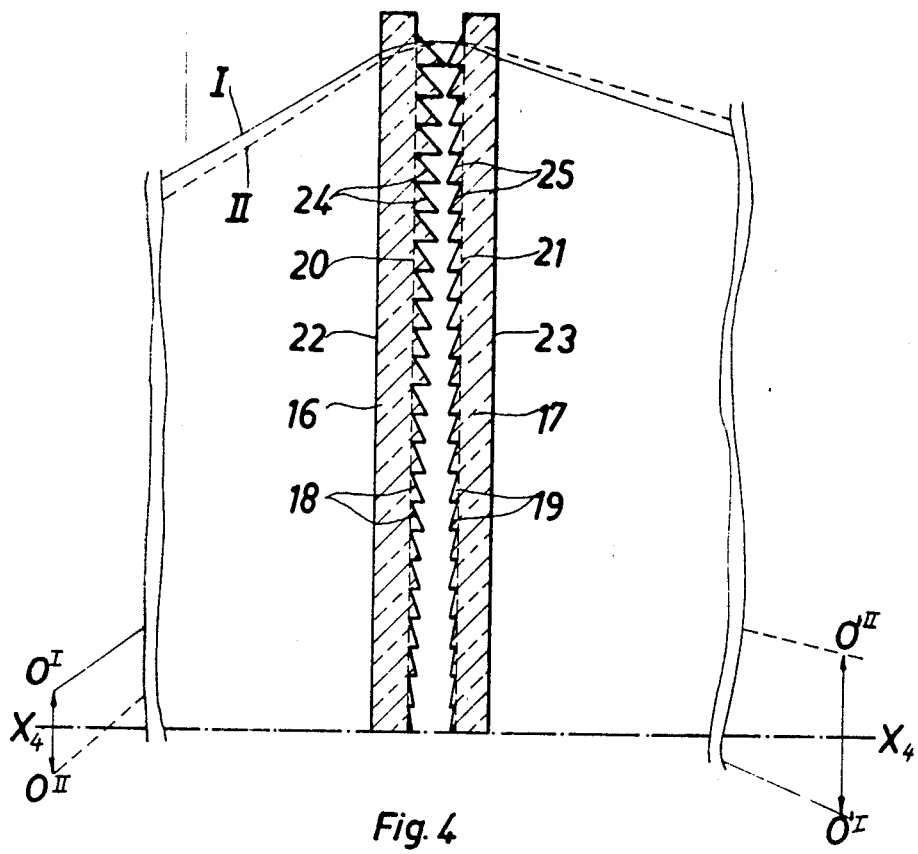
FIG. 4 is a third embodiment, namely an optical system including two Fresnel faces.

The embodiment of FIG. 4 has an optical axis $X_4-X_4$ and comprises two Fresnel lenses 16 and 17 (whereof approximately one half is shown in the drawing), the Fresnel faces 18 and 19 of which face one another and are carried on plane bases 20 and 21. The outer faces 22 and 23 of the lenses 16 and 17 are plane. The distance between the lenses 16 and 17 is negligible. The optical system 16, 17 projects an image of a concentric object $0'0''$ at $0''0'''$. Two imaging rays I and II are shown, for which the active Fresnel flanks 24, 25 are calculated by means of the equations (4) to (6). The preselected values of the system are:

TABLE 3

$s_{22} = -164$ mm $= s_o'$     $n_o' = n_{20}' = n_{23} = 1$
$s_{23}' = +337$ mm     $n_{22}' = n_{21}' = 1.493$
$d_{16} = 3$ mm $= d_{17}$
$d_{20} \to 0$

Moreover, there are known or have been calculated in a similar manner to that of FIG. 3:

TABLE 4

| | ray I | ray II |
|---|---|---|
| $y$ [mm] | + 12.9 | |
| $\sigma_1$ [o] | − 47.60 | − 43.28 |
| $h_1$ [mm] | + 170.2 | + 170.2 |
| $p_1$ [mm] | 0 | 0 |
| $\phi_1$ [o] | 0 | 0 |
| $\sigma_1'$ [o] | − 29.65 | − 27.33 |
| $h_2$ [mm] | + 171.7 | + 171.7 |
| $p_2$ [mm] | 0 | 0 |
| $\phi_2$ [o] | − 67.33 | − 67.33 |
| $\sigma_2'$ [o] | − 1.44 | + 6.35 |
| $h_3$ [mm] | + 171.7 | + 171.7 |
| $p_3$ [mm] | 0 | 0 |
| $\phi_3$ [o] | + 43.69 | + 43.69 |
| $\sigma_3'$ [o] | + 15.35 | + 19.72 |
| $h_4$ [mm] | + 170.9 | + 170.6 |
| $p_4$ [mm] | 0 | 0 |
| $\phi_4$ [o] | 0 | 0 |
| $\sigma_4'$ [o] | + 23.28 | + 30.25 |
| $y'$ [mm] | + 25.9 | − 25.9 |

The calculation of the optical system starts from both the object $0'0''$ and the image $0''0'''$. By inserting the respective magnitudes in the equations (4a) and (4b), the following values are obtained for the Fresnel face 18:

$h_m = -12.9 + (-167) \cdot \tan(-47.60°) - (3+0-0) \cdot \tan(-29.65°B)$
$= -12.9 + 167 \cdot 1.09522 + 3 \cdot 0.5691$
$h_m = +171.71$ mm
$h_m = 12.9 + (-167) \cdot \tan(-43.28°) - (3+0-0) \cdot \tan(-27.33°)$
$= 12.9 + 167 \cdot 0.94169 + 3 \cdot 0.51687$
$h_m = +171.71$ mm.

As $d_{20}' \approx 0$, the $h_m$ magnitudes obtained with respect to the Fresnel faces are the same. A calculation of the Fresnel faces that starts from the image side, relies on the equations (4c) and (4d). In both cases $h_m = +171.71$ mm.

The known or calculated magnitudes of $\sigma_i$ and $n_i$ for the faces 18 and 19 are inserted in the equation (6) and checked by means thereof. If 0 results with sufficient accuracy, the calculated values are likewise sufficiently accurate. If not, these magnitudes must be corrected until the equation (6) is satisfied.

Starting from the object side, the equation (6) furnishes for the Fresnel face 18:

$1 \cdot \sin(-1.44°-6.35°) - 1.493 \cdot \sin(-29.65°) - 1.493 \cdot \sin(-1.44°+27.33°)$ $+2.2290 \sin(-29.65°27.33°) = 0$ $-\sin 7.79° + 1.493 \cdot \sin 36.00° - 1.493 \sin 25.89° - 2.2290 \sin 2.32° = 0$ $-0.1355 + 1.493 \cdot 0.5878 - 1.493 \cdot 0.4366 - 2.2290 \cdot 0.0405 = 0$ $+0.8776 - 0.8776 = 0$ and for the Fresnel face 19:

$U = 2.2290 \cdot \sin(15.35°-19.72°) - 1.493 \cdot \sin(-1.44°-19.72°)$ $-1.493 \cdot \sin(15.35°-6.35°) + 1 \cdot \sin(-1.44°-6.35+) = 0$ $-2.2290 \sin 4.377° + 1.493 \sin 21.16° - 1.493 \sin 9.00° - \sin 7.79° = 0$ $-2.2290 \cdot 0.0762 + 1.493 \cdot 0.3610 - 1.493 \cdot 0.1564 - 0.1355 = 0$ $+0.5390 - 0.5389 = 0$ $0.0001 \approx 0$ The calculation using the ray II produces the same results. The equation (6) being satisfied, the inclinations $\phi_{24}$ and $\phi_{25}$ of the active flanks are calculated according to the equation (5a) or (5b). These inclinations are included in Table 4.

The foregoing calculations concern only one point in each Fresnel face. However, it is possible in quite the same manner to determine a sufficient multitude of points necessary for the correction of the Fresnel face.

With two Fresnel faces on a plane base in one lens, a single lens can be obtained that is corrected for a circle concentric with the optical axis.

Figure 5:
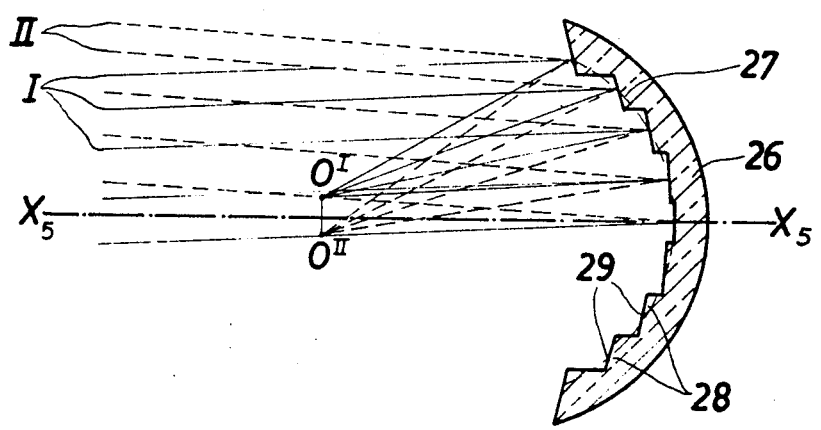
FIG. 5 is a fourth embodiment, which is a reflector.

In the embodiment of FIG. 5, a Fresnel reflector 26 concentric with the optical axis $X_S$-$X_S$ has an optically active base 27 with Fresnel echelons 28. The base 27 is calculated according to the equation (6), and the active flanks 29 satisfy the equations (5a) or (5b). The echelons 28 are shown to a different scale from that in FIG. 5. An object $O'O''$ symmetrical with regard to the optical axis $X_S$-$X_S$ is imaged at infinity with desired marginal definition. For the sake of clarity, the rays I and II respectively emanating from the points $O'$ and $O''$ are shown in only one half of the reflector 26.

We claim:

1. A Fresnel optical system which has echelons on at least one of its faces and produces an aberrationless image of a circle substantially concentric with the optical axis, wherein the meridional curve of the said face is determined by the equation $$n'^2_m \sin(\sigma'^I_m - \sigma'^{II}_m) - n'_m n'_{m-1} \sin(\sigma'^I_{m-1} - \sigma'^{II}_m)$$
$$- n'_m n'_{m-1} \sin(\sigma'^I_m - \sigma'^{II}_{m-1}) + n'^2_{m-1} \sin(\sigma'^I_{m-1} - \sigma'^{II}_{m-1}) = 0$$

and the active flanks of the Fresnel echelons are determined by the equations $$\tan \varphi_m^I = \frac{n'_{m-1} \sin \sigma'^I_{m-1} - n'_m \sin \sigma'^I_m}{n'_{m-1} \cos \sigma'^I_{m-1} - n'_m \cos \sigma'^I_m}$$

and $$\tan \varphi_m^{II} = \frac{n'_{m-1} \sin \sigma'^{II}_{m-1} - n'_m \sin \sigma'^{II}_m}{n'_{m-1} \cos \sigma'^{II}_{m-1} - n'_m \cos \sigma'^{II}_m}$$

where $n'_m$ is the refractive index on the image side of the Fresnel face, $n'_{m-1}$ is the refractive index on the object side of the Fresnel face, $\sigma'^I_m$ is the angle enclosed by an imaging ray I and the optical axis in the image space of the Fresnel face, $\sigma'^I_{m-1}$ is the angle enclosed by ray I and the optical axis in the object space of the Fresnel face, $\sigma'^{II}_m$ is the angle enclosed by an imaging ray II and the optical axis in the image space of the Fresnel face, $\sigma'^{II}_{m-1}$ is the angle enclosed by the ray II and the optical axis in the object space of the Fresnel face, $\phi'^I_m$ is the angle enclosed by the normal to the active Fresnel face and the optical axis of the ray I, and $\phi''^I_m$ is the angle enclosed by the normal to the active Fresnel face and the optical axis of the ray II.

2. An optical system as claimed in claim 1, which is a single lens having Fresnel echelons on one face, the other face being curved.

3. An optical system as claimed in claim 2, wherein the refractive powers of the various elements are so distributed that the achromasy condition is satisfied.

4. An optical system comprising echelons on at least one face for aberrationless imaging of a circle concentric with its axis, characterized in that it comprises two lenses each of which has a plane face and a Fresnel face, the Fresnel echelons on the two respective faces being determined by the equations $$n'^2_m \sin(\sigma'^I_m - \sigma'^{II}_m) - n'_m n'_{m-1} \sin(\sigma'^I_{m-1} - \sigma'^{II}_m)$$
$$- n'_m n'_{m-1} \sin(\sigma'^I_m - \sigma'^{II}_{m-1}) + n'^2_{m-1} \sin(\sigma'^I_{m-1} - \sigma'^{II}_{m-1}) = 0$$

$$\frac{n'^2_m \cdot \frac{2y'_m}{s'_m - p_m}}{\sqrt{1 + \left(\frac{h_m - y'_m}{s'_m - p_m}\right)^{2'}} \cdot \sqrt{1 + \left(\frac{h_m + y'_m}{s'_m - p_m}\right)^{2'}}}$$

$$+ \frac{n_m n'_m \cdot \left(\frac{h_m - y'_m}{s_m - p_m} - \frac{h_m + y'_m}{s'_m - p_m}\right)}{\sqrt{1 + \left(\frac{h_m - y'_m}{s_m + p_m}\right)^{2'}} \cdot \sqrt{1 + \left(\frac{h_m + y'_m}{s'_m - p_m}\right)^{2'}}}$$

$$+ \frac{n_m n'_m \cdot \left(\frac{h_m - y'_m}{s'_m - p_m} - \frac{h_m + y_m}{s_m - p_m}\right)}{\sqrt{1 + \left(\frac{h_m - y'_m}{s'_m - p_m}\right)^{2'}} \cdot \sqrt{1 + \left(\frac{h_m + y_m}{s_m - p_m}\right)^{2'}}}$$

$$+ \frac{n_m^2 \cdot \frac{2y_m}{s_m - p_m}}{\sqrt{1 + \left(\frac{h_m - y_m}{s_m - p_m}\right)^{2'}} \cdot \sqrt{1 + \left(\frac{h_m - y_m}{s_m - p_m}\right)^{2'}}} = 0$$

where $n'_m$ is the refractive index on the image side of the Fresnel face, $n'_{m-1}$ is the refractive index on the object side of the Fresnel face, $\sigma'^I_m$ is the angle enclosed by an imaging ray I and the optical axis in the image space of the Fresnel face, $\sigma'^I_{m-1}$ is the angle enclosed by the ray I and the optical axis in the object space of the Fresnel face, $\sigma'^{II}_m$ is the angle enclosed by an imaging ray II and the optical axis in the image space of the Fresnel face, $\sigma'^{II}_{m-1}$ is the angle enclosed by the ray II and the optical axis in the object space of the Fresnel face, $\phi'_m$ is the angle enclosed by the normal to the active Fresnel face and the optical axis of the ray I, and $\phi''_m$ is the angle enclosed by the normal to the active Fresnel face and the optical axis of the ray II.

5. An optical system as claimed in claim 4, wherein the Fresnel faces face one another.

6. An optical system as claimed in claim 5, wherein the refractive powers of the various elements are so distributed that the achromasy condition is satisfied.

7. An optical system having Fresnel echelons on all its faces for aberrationless imaging of a circle concentric with its axis, wherein the bases of the Fresnel faces are determined by the equation $$\frac{\frac{2y'}{s'-p}}{\sqrt{1+\left(\frac{h-y'}{s'-p}\right)^2} \cdot \sqrt{1+\left(\frac{h+y'}{s-p}\right)^2}}$$

$$+ \frac{\left(\frac{h-y}{s-p} - \frac{h+y'}{s'-p}\right)}{\sqrt{1+\left(\frac{h-y}{s-p}\right)^2} \cdot \sqrt{1+\left(\frac{h+y'}{s'-p}\right)^2}}$$

$$+ \frac{\left(\frac{h-y'}{s'-p} - \frac{h+y}{s-p}\right)}{\sqrt{1+\left(\frac{h-y'}{s'-p}\right)^2} \cdot \sqrt{\left(1+\frac{h+y}{s-p}\right)^2}}$$

$$+ \frac{\frac{2y}{s-p}}{\sqrt{1+\left(\frac{h-y}{s-p}\right)^2} \cdot \sqrt{1+\left(\frac{h+y}{s-p}\right)^2}} = 0$$

and the active flanks of the Fresnel echelons are determined by the equations $$\tan \varphi_m^I = \frac{n'_{m-1} \sin \sigma'^I_{m-1} - n'_m \sin \sigma'^I_m}{n'_{m-1} \cos \sigma'^I_{m-1} - n'_m \cos \sigma'^I_m}$$

and $$\tan \varphi_m^{II} = \frac{n'_{m-1} \sin \sigma'^{II}_{m-1} - n'_m \sin \sigma'^{II}_m}{n'_{m-1} \cos \sigma'^{II}_{m-1} - n'_m \cos \sigma'^{II}_m}$$

where $n_m$ is the index of refraction on the object side of the face m, $n'_m$ is the index of refraction on the image side of the face m.

$h_m$ is the height of incidence of the imaging ray,
$p_m$ is the corresponding height of arc,
$s_m$ is the distance between object and lens vertex,
$s'_m$ is the distance between image and lens vertex,
$y_m$ is the dimension of the object in the meridional section on either side of the optical axis of the system, referring to the face m,
$y'_m$ is the dimension of the image in the meridional section on either side of the optical axis of the system, referring to the face m,
$\phi_m{}'$ is the angle enclosed by the normal to the active Fresnel face and the optical axis of the ray I, and
$\phi_m{}''$ is the angle enclosed by the normal to the active Fresnel face and the optical axis of the ray II.

8. An optical system as claimed in claim 7, wherein at least one face is a plane face lying in an intermediate image plane.

9. An optical reflector comprising Fresnel echelons as reflecting face for aberrationless imaging of a circle concentric with the optical axis, wherein the base of the reflector is determined by the equation $$\tan \varphi_m{}^I = \frac{n'_{m-1} \sin \sigma'_{m-1}{}^I - n'_m \sin \sigma_m{}'^I}{n'_{m-1} \cos \sigma'_{m-1}{}^I - n'_m \cos \sigma_m{}'^I}$$

and $$\tan \varphi_m{}^{II} = \frac{n'_{m-1} \sin \sigma'_{m-1}{}^{II} - n'_m \sin \sigma_m{}'^{II}}{n'_{m-1} \cos \sigma'_{m-1}{}^{II} - n'_m \cos \sigma_m{}'^{II}}$$

and the active flanks of the Fresnel echelons are determined by the equations $$\tan \varphi_m{}^I = \frac{n'_{m-1} \sin \sigma'_{m-1}{}^I - n'_m \sin \sigma_m{}'^I}{n'_{m-1} \cos \sigma'_{m-1}{}^I - n'_m \cos \sigma_m{}'^I}$$

and $$\tan \varphi_m{}^{II} = \frac{n'_{m-1} \sin \sigma'_{m-1}{}^{II} - n'_m \sin \sigma_m{}'^{II}}{n'_{m-1} \cos \sigma'_{m-1}{}^{II} - n'_m \cos \sigma_m{}'^{II}}$$

where
$h$ is the height of incidence of the imaging ray,
$p$ is the corresponding height of arc,
$s$ and $s'$ are respectively the distance between object and lens vertex and the distance between image and lens vertex,
$y$ and $y'$ are respectively the dimensions of the object and the image in the meridional section on either side of the optical axis of the Fresnel reflector,
$\phi_m{}'$ is the angle enclosed by the normal to the active Fresnel face and the optical axis of the ray I, and
$\phi_m{}''$ is the angle enclosed by the normal to the active Fresnel face and the optical axis of the ray II.

* * * * *